Patented Nov. 11, 1941

2,262,481

UNITED STATES PATENT OFFICE 2,262,481

ACCELERATOR FOR THE VULCANIZATION OF RUBBER

Ira Williams, Borger, Tex., assignor to E. I. du Pont de Nemours & Company, Wilmington, Del., a corporation of Delaware No Drawing. Application January 12, 1939, Serial No. 250,553

21 Claims. (Cl. 260—787)

This invention relates to the vulcanization of rubber and more particularly to a new class of accelerators for the vulcanization of rubber. The application of heterocyclic compounds, such as mercapto-benzothiazole, its salts and its organic derivatives, in the vulcanization of rubber is old in the art. It has been proposed to use 2-mercapto-thiazoline as an accelerator for the vulcanization of rubber. 2-mercapto-thiazoline has the formula

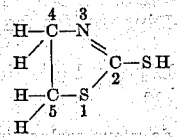

It is a mild accelerator, but its accelerating properties can be greatly altered by modifying the compound, particularly by replacing the hydrogen of the mercaptan radicle with suitable organic groups. 2-mercapto-thiazoline is acidic in nature and readily forms salts with basic materials such as ammonia, amines, guanidines, sulfonium bases, quaternary ammonium bases and similar materials. These salts are all characterized by the electrovalent coupling of the positive radicle to the sulfur of the mercaptan group and constitute a class of accelerators which is extremely active, particularly at low temperatures. This extreme activity is objectionable in most cases, as it tends to cause prevulcanization or scorching of the rubber mix during the usual mixing and processing operations preceding the vulcanization operation.

It is an object of the present invention to provide a new class of accelerators for the vulcanization of rubber. Another object is to provide a class of accelerators which are non-staining, free from scorching and capable of being used under a wide variety of vulcanization conditions. A further object is to provide an improved method for the vulcanization of rubber. Still further objects are to provide new compositions of matter and to advance the art. Still other objects will appear hereinafter.

The above and other objects may be accomplished in accordance with my invention which comprises incorporating into a rubber mix prior to vulcanization a small amount of a 2-mercapto-thiazoline in which the hydrogen of the mercaptan group has been substituted by an organic radicle which is more strongly electron attracting than the ortho-tolyl radicle, the carbon of the electron attracting group being connected to sulfur by a covalent bond. A covalent bond may be distinguished from an electrovalent bond by the fact that, in the covalent type of coupling, there is a sharing of electrons between the sulfur and the carbon atom in the attached radicle and the resulting compound has a very greatly decreased tendency to ionize in solution.

The methods for determining the electron attraction of an organic group are well established and are described in the literature, particularly by M. S. Kharasch and his collaborators in J. Am. Chem. Soc. 47, 1948 (1925), 48, 3130 (1926), J. Chem. Ed. 5, 404 (1928) and 11, 82 (1934) and by F. C. Whitmore and H. Bernstein in J. Am. Chem. Soc. 60, 2626 (1938). When radicles are classified in accordance with such method, I find that if the hydrogen of the mercaptan group of a 2-mercapto-thiazoline is replaced by a radicle which is more strongly electron attracting than the ortho-tolyl group, the resulting compounds provide a class of valuable accelerators which are very active at the usual vulcanizing temperatures, but are substantially inactive at the lower processing temperatures. On the other hand, when the hydrogen of the mercaptan group of a 2-mercapto-thiazoline is replaced by an organic radicle which is more weakly electron attracting than the ortho-tolyl group, the resulting compounds have either no or very little activity for accelerating the vulcanization of rubber. Amongst the organic groups, which are more strongly electron attracting than the ortho-tolyl group and which are desirable for producing 2-mercapto-thiazoline derivatives within my invention, are hydroxy-methyl, 4-nitro-phenyl, 2-chloro-4-nitro-phenyl, para-cyano-phenyl, ortho-trifluormethyl-phenyl, sulfonated phenyl, sulfonated nitrophenyl, 2-benzothiazyl, 2-thiazolinyl, 2:4-dinitro-phenyl, 2:4:6-trinitro-phenyl, acetyl, phenyl-acetyl, formyl, benzoyl, para-methyl-benzoyl, ortho-hydroxy-benzoyl, ortho-methyl-para-propyl-benzoyl, para-nitro-benzoyl, furoyl, diphenyl-carbamyl, methyl-phenyl-carbamyl, dibutyl-carbamyl, ortho-tolyl-carbamyl, and hexamethylene-carbamyl, and the organic radicles of the chlor-carbonic esters. Sulfur analogues of the above oxygen compounds are also effective. The compounds derived from organic acid chlorides, such as benzoyl chloride and furoyl chloride, appear to be the most effective and are preferred.

Representative compounds which I have found to be effective accelerators for the vulcanization of rubber are:

2:4-dinitrophenyl-2-thiazolinyl sulfide

Benzoyl-2-thiazolinyl sulfide
p-Methoxy-benzoyl-2-thiazolinyl sulfide
p-Nitro-benzoyl-2-thiazolinyl sulfide
p-Cyano-benzoyl-2-thiazolinyl sulfide
Furoyl-2-thiazolinyl sulfide
Phthalyl-2-thiazolinyl sulfide
Acetyl-2-thiazolinyl sulfide
Acetonyl-2-thiazolinyl sulfide
Carbonyl-2-thiazolinyl sulfide
2-thiazolinyl-2-thiazolinyl sulfide
2-benzothiazyl-2-thiazolinyl sulfide
Diphenyl carbamyl-2-thiazolinyl sulfide
Phenyl methyl carbamyl-2-thiazolinyl sulfide
Hexahydrobenzoyl-2-thiazolinyl sulfide
2:4-dinitrophenyl-(5:5-dimethyl- 2 -thiazolinyl) sulfide
Benzoyl-(5:5-dimethyl-2-thiazolinyl) sulfide
The ethyl chloracetate derivative of 2-mercapto-thiazoline
The dichloracetamide derivative of 2-mercapto-thiazoline Some of the organic groups which are less strongly electron attracting than the ortho-tolyl group and which produce compounds which have little or no accelerating properties are methyl, ethyl, propyl, isopropyl, butyl, isobutyl, higher alkyl straight or branched chain hydrocarbon radicals, benzyl, diphenyl-methyl, triphenyl-methyl, beta-naphthyl-methyl, para-ethyl-benzyl, para-phenyl-benzyl, phenyl, 2:5-dihydroxy-phenyl, 3:4-dihydroxy-phenyl, 2:3-dihydroxy-phenyl, 3:5-dihydroxy-phenyl, 2-hydroxy-phenyl, meta-nitro-phenyl, allyl, crotyl, beta-phenyl-ethyl, cyclohexyl and para-nitro-benzyl.

Representative compounds of this latter type which are either very weak accelerators or else have no accelerating properties are as follows:

Ethyl-2-thiazolinyl sulfide
Benzyl-2-thiazolinyl sulfide
Triphenylmethyl-2-thiazolinyl sulfide
p-Nitrobenzyl-2-thiazolinyl sulfide
Methallyl-2-thiazolinyl sulfide
o-Hydroxyphenyl-2-thiazolinyl sulfide
2-hydroxypropyl-2-thiazolinyl sulfide
Alpha-naphthylmethyl-2-thiazolinyl sulfide While the compounds derived from 2-mercapto-thiazoline will generally be preferred and particularly because of their cost and the availability of the thiazoline, other 2-mercapto-thiazolines may be employed, and particularly those containing substituents in the 4 or 5 position or both. While the thiazolines which contain only hydrogen or low molecular weight alkyl groups (1 to 6 carbon atoms) are preferred, the thiazolines may contain other substituents in the 4 and 5 positions, such as aryl, aralkyl, halogen, hydroxy, alkoxy, amino, nitro and like groups. Also, if desired, the alkyl, aryl and aralkyl radicals may contain substituents such as hydroxyl, alkoxy, halogen, amino and nitro substituents if desired, but are preferably unsubstituted.

Representative 2-mercapto-thiazolines which may be employed to produce derivatives within the scope of my invention and which derivatives will be effective accelerators for the vulcanization of rubber are:

2-Mercapto-4-methyl-thiazoline
2-Mercapto-4:4-dimethyl-thiazoline
2-Mercapto-4:5-dimethyl-thiazoline
2-Mercapto-5:5-dimethyl-thiazoline
2-Mercapto-5-methyl-thiazoline
2-Mercapto-4-ethyl-thiazoline
2-Mercapto-4-butyl-thiazoline
2-Mercapto-4-methyl-5-butyl-thiazoline
2-Mercapto-4-benzyl-thiazoline
2-Mercapto-4-phenyl-thiazoline
2-Mercapto-4-beta-hydroxyethyl-thiazoline
2-Mercapto-4-beta-chlorethyl-thiazoline
2-Mercapto-4-OH-thiazoline
2-Mercapto-4-chloro-thiazoline
2-Mercapto-4-amino-thiazoline
2-Mercapto-5-chloro-thiazoline
2-Mercapto-5-OH-thiazoline
2-Mercapto-5-amino-thiazoline In order to more clearly illustrate my invention, the preferred modes of carrying the same into effect and the advantageous results to be obtained thereby, the following example is given:

*Example 1*

A rubber compound containing 100 parts of smoked sheet, 5 parts of zinc oxide, 3 parts of sulfur, 3 parts of stearic acid and 25 parts of channel black by weight was prepared. Portions of this compound were treated with 1 part of the following thiazoline derivatives based on the rubber content.

*Compound 1.*—Benzoyl-2-thiazolinyl sulfide
*Compound 2.*—2:4-dinitro-phenyl-2-thiazolinyl sulfide
*Compound 3.*—Furoyl-2-thiazolinyl sulfide
*Compound 4.*—Diphenyl-carbamyl - 2 - thiazolinyl sulfide
*Compound 5.*—Diphenyl guanidine salt 2-mercapto-thiazoline These compounds were vulcanized at temperatures of 227° F. and 274° F. with the following results:

| Temperature of cure, °F. | Minutes cure | Lbs./sq. in. at 600% elong. compound | | | | | Lbs./sq. in. at break compound | | | | |
|---|---|---|---|---|---|---|---|---|---|---|---|
| | | 1 | 2 | 3 | 4 | 5 | 1 | 2 | 3 | 4 | 5 |
| 227 | 30 | | | | | 625 | 175 | | | 150 | 1375 |
| 227 | 60 | 250 | | 575 | 100 | 1700 | 725 | | 1250 | 275 | 3450 |
| 274 | 20 | 1750 | 875 | 1925 | 675 | 3475 | 2675 | 1300 | 2725 | 875 | 5225 |
| 274 | 45 | 3325 | 2550 | 3075 | 1650 | 4225 | 4550 | 3900 | 4475 | 2425 | 5300 |
| 274 | 90 | 4325 | 3375 | 3475 | 2350 | 4650 | 5250 | 4125 | 4725 | 3150 | 4950 |
| 274 | 120 | 4375 | 3375 | 3900 | 2650 | 4550 | 4850 | 3925 | 4450 | 3200 | 4675 |

Compound No. 5, the diphenyl guanidine salt of 2-mercapto-thiazoline, was used for comparative purposes. It will be noted that this salt was very active at 227° F., and hence would tend to cause prevulcanization or scorching during the processing operations.

While the above example shows the results with some of the compounds of my invention and one mode of employing the same, many modifications therein will be apparent to one skilled in the art. For example, my accelerators may be employed in the presence of activating agents such as the amines and the guanidines. Also, my accelerators may be used or mixed with other accelerators such as mercapto-arylene-thiazoles, thioureas, dithio-carbamates and thiuram sulfides. Also, many compounds other than those specifically named will be apparent to those skilled in the art. Furthermore, the amount of accelerator employed may be greatly varied as is usual in this art, and the amount employed will usually vary from about 0.1 to 2% based on the rubber, depending upon the rubber composition and the results desired.

The general method of preparing compounds of my invention are well known and are described in the literature. For example, the sodium salt of the 2-mercaptothiazoline may be treated with an organic halide, preferably in an inert solvent such as alcohol or benzene, with the elimination of sodium halide and the replacement of the sodium by the organic radicle. The reaction may be caused to take place at room temperature, but it is preferable to use higher temperatures and particularly refluxing temperatures. This method is suitable for preparing derivatives such as the benzoyl, dinitrophenyl, and the like.

If desired, the free mercaptan may be treated with an organic halide even in the absence of a solvent, particularly at elevated temperatures, whereby the volatile hydrogen halide may be eliminated. Furthermore, the mercaptan, even alone or mixed with other mercaptans, may be treated with an aldehyde to form covalent compounds of my invention. The hydroxy methyl derivative will thus be produced by the reaction of formaldehyde with the mercaptan.

The mercaptan may be treated with phosgene with the subsequent elimination of carbon oxy sulfide and the formation of the corresponding thiazolinyl mono-sulfide. Many other methods of forming covalent compounds in which an organic radicle is attached to the sulfur will be apparent to those skilled in the art.

While I have disclosed the preferred embodiments of my invention and the preferred modes of carrying the same into effect, it will be apparent to those skilled in the art that many variations and modifications may be made therein without departing from the spirit of my invention. Accordingly, the scope of my invention is to be limited solely by the appended claims construed as broadly as is permissible in view of the prior art.

I claim:

1. The method of vulcanizing rubber which comprises incorporating into a rubber mix, prior to vulcanization, a small amount of a 2-mercaptothiazoline in which the hydrogen of the mercaptan group has been substituted by an organic radicle more strongly electron attracting than the ortho-tolyl radicle, which organic radicle is connected to the thiazolinyl radicle by means of a covalent bond between a carbon atom of the organic radicle and the mercapto sulfur atom of the thiazolinyl radicle.

2. The method of vulcanizing rubber which comprises incorporating into a rubber mix, prior to vulcanization, a small amount of a 2-mercapto-thiazoline in which the hydrogen of the mercaptan group has been substituted by an organic radicle more strongly electron attracting than the ortho-tolyl radicle, which organic radicle is connected to the thiazolinyl radicle by means of a covalent bond between a carbon atom of the organic radicle and the mercapto sulfur atom of the thiazolinyl radicle, and in which substituents on the thiazoline ring, consist of carbon and hydrogen.

3. The method of vulcanizing rubber which comprises incorporating into a rubber mix, prior to vulcanization, a small amount of a 2-mercapto-thiazoline in which the hydrogen of the mercaptan group has been substituted by an organic radicle more strongly electron attracting than the ortho-tolyl radicle, which organic radicle is connected to the thiazolinyl radicle by means of a covalent bond between a carbon atom of the organic radicle and the mercapto sulfur atom of the thiazolinyl radicle, and in which substituents on the thiazoline ring are selected from hydrogen and alkyl radicles.

4. The method of vulcanizing rubber which comprises incorporating into a rubber mix, prior to vulcanization, a small amount of 2-mercaptothiazoline in which the hydrogen of the mercaptan group has been substituted by an organic radicle more strongly electron attracting than the ortho-tolyl radicle, which organic radicle is connected to the thiazolinyl radicle by means of a covalent bond between a carbon atom of the organic radicle and the mercapto sulfur atom of the thiazolinyl radicle.

5. The method of vulcanizing rubber which comprises incorporating into a rubber mix, prior to vulcanization, a small amount of a 2-mercapto-thiazoline in which the hydrogen of the mercaptan group has been substituted by an organic acyl radicle, which acyl radicle is more strongly electron attracting than the ortho-tolyl radicle, the carbon atom of the carbonyl group of the acyl radicle being connected to the mercapto sulfur atom of the thiazolinyl radicle by a covalent bond.

6. The method of vulcanizing rubber which comprises incorporating into a rubber mix, prior to vulcanization, a small amount of a 2-mercapto-thiazoline in which the hydrogen of the mercaptan group has been substituted by an organic acyl radicle, which acyl radicle is more strongly electron attracting than the ortho-tolyl radicle, the carbon atom of the carbonyl group of the acyl radicle being connected to the mercapto sulfur atom of the thiazolinyl radicle by a covalent bond, and in which the thiazolinyl radicle is free of substituents containing elements other than carbon and hydrogen.

7. The method of vulcanizing rubber which comprises incorporating into a rubber mix, prior to vulcanization, a small amount of a 2-mercapto-thiazoline in which the hydrogen of the mercaptan group has been substituted by an organic acyl radicle, which acyl radicle is more strongly electron attracting than the ortho-tolyl radicle, the carbon atom of the carbonyl group of the acyl radicle being connected to the mercapto sulfur atom of the thiazolinyl radicle by a covalent bond, and in which substituents on the thiazoline ring are selected from hydrogen and alkyl radicles.

8. The method of vulcanizing rubber which comprises incorporating into a rubber mix, prior to vulcanization, a small amount of 2-mercaptothiazoline in which the hydrogen of the mercaptan group has been substituted by an organic acyl radicle, which acyl radicle is more strongly electron attracting than the ortho-tolyl radicle, the carbon atom of the carbonyl group of the acyl radicle being connected to the mercapto sulfur atom of the thiazolinyl radicle by a covalent bond.

9. The method of vulcanizing rubber which comprises incorporating into a rubber mix, prior to vulcanization, a small amount of benzoyl-2-thiazolinyl sulfide.

10. Rubber having incorporated therein, as a vulcanization accelerator, a small amount of a 2-mercapto-thiazoline in which the hydrogen of the mercaptan group has been substituted by an organic radicle more strongly electron attracting than the ortho-tolyl radicle, which organic radicle is connected to the thiazolinyl radicle by means of a covalent bond between a carbon atom of the organic radicle and the mercapto sulfur atom of the thiazolinyl radicle.

11. Rubber having incorporated therein, as a vulcanization accelerator, a small amount of a 2-mercapto-thiazoline in which the hydrogen of the mercaptan group has been substituted by an organic radicle more strongly electron attracting than the ortho-tolyl radicle, which organic radicle is connected to the thiazolinyl radicle by means of a covalent bond between a carbon atom of the organic radicle and the mercapto sulfur atom of the thiazolinyl radicle, and in which substituents on the thiazoline ring consist of carbon and hydrogen.

12. Rubber having incorporated therein, as a vulcanization accelerator, a small amount of a 2-mercapto-thiazoline in which the hydrogen of the mercaptan group has been substituted by an organic radicle more strongly electron attracting than the ortho-tolyl radicle, which organic radicle is connected to the thiazolinyl radicle by means of a covalent bond between a carbon atom of the organic radicle and the mercapto sulfur atom of the thiazolinyl radicle, and in which substituents on the thiazoline ring are selected from hydrogen and alkyl radicles.

13. Rubber having incorporated therein, as a vulcanization accelerator, a small amount of 2-mercapto-thiazoline in which the hydrogen of the mercaptan group has been substituted by an organic radicle more strongly electron attracting than the ortho-tolyl radicle, which organic radicle is connected to the thiazolinyl radicle by means of a covalent bond between a carbon atom of the organic radicle and the mercapto sulfur atom of the thiazolinyl radicle.

14. Rubber having incorporated therein, as a vulcanization accelerator, a small amount of a 2-mercapto-thiazoline in which the hydrogen of the mercaptan group has been substituted by an organic acyl radicle, which acyl radicle is more strongly electron attracting than the ortho-tolyl radicle, the carbon atom of the carbonyl group of the acyl radicle being connected to the mercapto sulfur atom of the thiazolinyl radicle by a covalent bond.

15. Rubber having incorporated therein, as a vulcanization accelerator, a small amount of a 2-mercapto-thiazoline in which the hydrogen of the mercaptan group has been substituted by an organic acyl radicle, which acyl radicle is more strongly electron attracting than the ortho-tolyl radicle, the carbon atom of the carbonyl group of the acyl radicle being connected to the mercapto sulfur atom of the thiazolinyl radicle by a covalent bond, and in which the thiazolinyl radicle is free of substituents containing elements other than carbon and hydrogen.

16. Rubber having incorporated therein, as a vulcanization accelerator, a small amount of a 2-mercapto-thiazoline in which the hydrogen of the mercaptan group has been substituted by an organic acyl radicle, which acyl radicle is more strongly electron attracting than the ortho-tolyl radicle, the carbon atom of the carbonyl group of the acyl radicle being connected to the mercapto sulfur atom of the thiazolinyl radicle by a covalent bond, and in which substituents on the thiazoline ring are selected from hydrogen and alkyl radicles.

17. Rubber having incorporated therein, as a vulcanization accelerator, a small amount of 2-mercapto-thiazoline in which the hydrogen of the mercaptan group has been substituted by an organic acyl radicle, which acyl radicle is more strongly electron attracting than the ortho-tolyl radicle, the carbon atom of the carbonyl group of the acyl radicle being connected to the mercapto sulfur atom of the thiazolinyl radicle by a covalent bond.

18. Rubber having incorporated therein, as a vulcanization accelerator, a small amount of benzoyl-2-thiazolinyl sulfide.

19. Rubber having incorporated therein, as a vulcanization accelerator, a small amount of acetyl-2-thiazolinyl sulfide.

20. Rubber having incorporated therein, as a vulcanization accelerator, a small amount of a 2-mercapto-thiazoline in which the hydrogen of the mercaptan group has been substituted by an organic carbamyl radicle, which carbamyl radicle is more strongly electron attracting than the ortho-tolyl radicle, the carbon atom of the carbamyl group of the carbamyl radicle being connected to the mercapto sulfur atom of the thiazolinyl radicle by a covalent bond, and in which substituents on the thiazoline ring are selected from hydrogen and alkyl radicles.

21. Rubber having incorporated therein, as a vulcanization accelerator, a small amount of diphenyl carbamyl-2-thiazolinyl sulfide.

IRA WILLIAMS.